United States Patent [19]
Spry

[11] 3,843,640
[45] Oct. 22, 1974

[54] 2-SPIROCYCLOPROPYL-3-CEPHEM ANTIBIOTICS
[75] Inventor: Douglas O. Spry, Indianapolis, Ind.
[73] Assignee: Eli Lilly and Company, Indianapolis, Ind.
[22] Filed: July 28, 1972
[21] Appl. No.: 275,985

[52] U.S. Cl............................. 260/243 C, 424/246
[51] Int. Cl............................................ C07d 99/24
[58] Field of Search................................ 260/243 C

[56] References Cited
UNITED STATES PATENTS
3,578,660   5/1971   Cooper........................... 260/243 C
3,660,395   5/1972   Wright et al.................... 260/243 C Primary Examiner—Nicholas S. Rizzo
Attorney, Agent, or Firm—William P. Scanlon; Everet F. Smith

[57] ABSTRACT

7-Acylamino-2-spirocyclopropyl-3-(substituted)-3-cephem-4-carboxylic acids and esters are prepared via carbanion addition to 2-methylene cephalosporin sulfoxides.

15 Claims, No Drawings

2-SPIROCYCLOPROPYL-3-CEPHEM ANTIBIOTICS

BACKGROUND OF THE INVENTION

This invention is concerned with the cephalosporin antibiotics. In particular it is concerned with the preparation of 2-spirocyclopropyl cephalosporins and a process for the preparation thereof.

The major salients for chemical modification of the cephalosporin molecule have been the 3-position and the 7-position. Modifications at the 2-position have not been as extensively known, probably because of the effect of the vicinal sulfur atom and its various oxidation states. 2-Monosubstituted alkyl and 2-dimethyl cephalosporins are known, but heretofore cephalosporins bearing spiroalkane substituents at the 2-position have not been known. It is an object of this invention to provide 7-acylamino-2-spirocyclopropyl-3-(substituted)-3-cephem-4-carboxylic acids and 7-acylamino-7-methoxy-2-spirocyclopropyl-3-(substituted)-3-cephem-4-carboxylic acids which employ as starting materials the 2-methylene cephalosporins available by the method of Wright, et al., J. Med. Chem. 14, 426 (1971).

In the chemical modification of cephalosporins it is often desirable to cleave the 7-carboxamido group to obtain a free amino group in the 7-position. One method of cleaving an amido group to obtain the free amine is that described by Lander, *J. Chem. Soc.*, 83, 320 (1903). In accordance with Lander's method the amide is treated with a halogenating agent to convert the amido group to an imino halide and the imino halide is treated with an alcohol to obtain the imino ether which is then hydrolyzed to the free amine. The application of this method to the cleavage of cephalosporin C to 7-aminocephalosporanic acid (7-ACA) is disclosed in Canadian Patent 770,125 and British Patent 1,041,985.

Cleavage of the carboxamido group of the 7-acylamino-2-spirocyclopropyl cephalosporins of this invention provides the 7-amino-2-spirocyclopropyl cephalosporins and the 7-amino-7-methoxy-2-spirocyclopropyl cephalosporins described herein.

SUMMARY OF THE INVENTION

The compounds provided by this invention are represented by the following general formula,

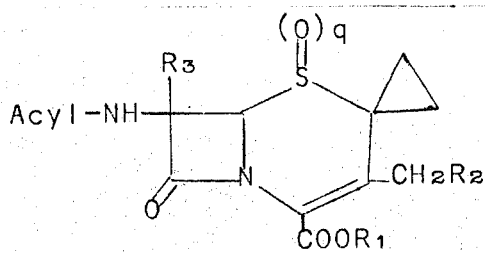

wherein the term "acyl" represents a wide variety of known side chains of the cephalosporin antibiotics such as phenylacetyl, phenylmercaptoacetyl, phenylglycyl, mandelyl, and the like; $R_1$, represents hydrogen, an alkali or alkaline earth metal cation or an anhydride- or ester-forming moiety and preferably one which is easily removed so as to provide the carboxylic acid form of the desired antibiotic; $R_2$ represents hydrogen, $C_2$-$C_5$ alkanoyloxy, or $C_1$-$C_4$ alkyloxy; and $R_3$ represents hydrogen or methoxy. The symbol $q$ is 0 or 1 indicating the sulfide or sulfoxide state of the sulfur atom in the dihydrothiazine ring of the cephalosporin. As used herein, the term, "cephalosporin," refers to those compounds having the 3-cephem ring structure and includes 3-methyl-3-cephem compounds (the deacetoxycephalosporanic acids), the 3-acetoxymethyl-3-cephem compounds (the cephalosporanic acids), and the 7-acylamino-3-(substituted-methyl)-3-cephem-4-carboxylic acid derivatives. The term, "2-spirocyclopropyl," as used herein indicates that the carbon atom which is common to both the cyclopropyl and the cephem moieties is at the 2-position of the cephalosporin.

The 7-methoxy-2-spirocyclopropyl cephalosporins of the above general formula are prepared by reacting a 2-spiro-cyclopropyl cephalosporin ester described above in an inert solvent at sub-zero temperatures and preferably between –90°C. and –15°C. with an alkali metal methoxide in the presence of an excess of methanol. To the cold reaction mixture is then added a positive halogen compound such as, for example, tertiary-butyl hypochlorite or N-chloro-acetamide, and the reaction mixture is stirred in the cold for an additional 5 to 20 minutes. Thereafter the reaction is quenched by the addition of glacial acetic acid or formic acid. The 7-methoxy-2-spirocyclopropyl cephalosporins can be recovered from the reaction mixture by conventional isolation procedures to provide the 7-methoxy-2-spirocyclopropyl cephalosporin ester. Removal of the ester group provides a compound of the invention represented by the above formula. The compounds of the invention exhibit the usual infrared absorption characteristics exhibited by the unsubstituted cephalosporanic acids. The compounds of the invention also exhibit the nuclear magnetic resonance spectra (NMR) characteristic of cyclopropyl compounds.

The 2-spirocyclopropyl and 7-methoxy-2-spirocyclopropyl cephalosporins provided by this invention inhibit the growth of pathogenic organisms.

DETAILED DESCRIPTION

The 2-spirocyclopropyl cephems of the present invention are represented by Formula I

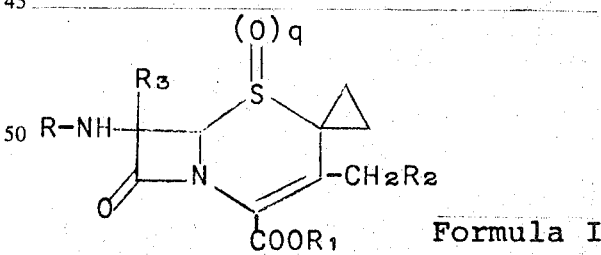

Formula I wherein R is hydrogen, $C_1$-$C_8$ alkanoyl, benzoyl, or a group represented by the formula

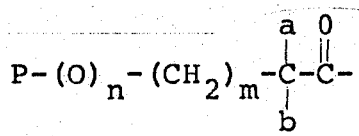

wherein P is 2-thienyl, 3-thienyl, 2-furyl, 3-furyl, phenyl or substituted phenyl;
 $n$ is 0 or 1;
 $m$ is 0 or an integer from 1 to 3;
 $a$ is hydrogen or $C_1$-$C_3$ alkyl;

b is hydrogen, $C_1$-$C_3$ alkyl, hydroxy, protected hydroxy, amino or protected amino;
with the limitation that when n is 1, P is phenyl or substituted phenyl and b is hydrogen or $C_1C_3$ alkyl;

$R_1$ is hydrogen, a carboxylic acid protecting group, or an alkali metal or alkaline earth metal cation;
$R_2$ is hydrogen, $C_2$-$C_5$ alkanoyloxy, or $C_1$-$C_4$ alkyloxy;
$R_3$ is hydrogen or methoxy. The symbol q is 0 or 1 indicating the sulfide or sulfoxide state of the sulfur atom in the ring. When q is 1, $R_3$ is hydrogen and when q is 0, $R_3$ is hydrogen or methoxy.

As used herein, the term "$C_1$-$C_8$ alkanoyl" refers to formyl, acetyl, propionyl, butyryl, pivaloyl, hexanoyl, heptanoyl and like groups represented by the formula

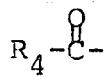

where $R_4$ is hydrogen or a straight or branched chain alkyl group having from 1 to 7 carbon atoms.

Representative of the 7-acylamino group R, when R is

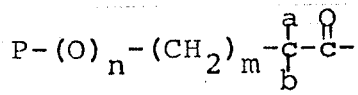

are phenylacetyl, phenoxyacetyl, 2-thienylacetyl, 3-thienylacetyl, 2-furylacetyl, 3-furyl-acetyl, 4-methylphenylacetyl, 4-methoxy-3-ethoxyphenylacetyl, phenylglycyl, β-phenylpropionyl, α-methylphenylacetyl, α,α-dimethylphenylacetyl, α-hydroxyphenylacetyl, α-n-propylphenylacetyl, 3-hydroxyphenylacetyl, 4-hydroxphenyl-acetyl, 3-hydroxyphenylglycyl, 4-hydroxyphenylglycyl, 4-t-butylphenoxyacetyl, 3-phenoxypropionyl, 4-chlorophenoxy-acetyl, 4-phenylbutyryl, 4-phenoxybutyryl, 5-phenyl-valeryl, 5-phenoxyvaleryl. 3-bromophenoxyacetyl, α-amino-thienylacetyl, and like 7-acylamino groups.

The term "protected amino" as employed herein refers to the amino group substituted by one of the commonly employed protecting groups, for example, t-butyloxycarbonyl, 2,2,2-trichloroethoxycarbonyl, benzyloxycarbonyl, and like protecting groups. "Protected hydroxy" refers to an hydroxyl group substituted by any of the commonly employed hydroxyl protecting groups such as benzyl, benzhydryl, t-butyloxycarbonyl (t-BOC), benzyloxycarbonyl, 2,2,2-trichloroethoxycarbonyl, formyl and ethylvinyl ether. It is preferable to employ a protecting group, such as one of those mentioned above, which is substantially stable under the reaction conditions, but the particular protecting group chosen is not critical in the present process.

"Substituted phenyl" refers to halophenyl such as 4-fluorophenyl, 3,4-dichlorophenyl, 2-bromophenyl and 3-chlorophenyl, phenyl substituted by $C_1$-$C_4$ lower alkyl such as 4-ethylphenyl, 3,4-dimethylphenyl, 4-t-butylphenyl 4-isopropylphenyl, and 2-methylphenyl, phenyl substituted by $C_1$-C4 lower alkoxy such as 2,6 dimethoxyphenyl, 4-ethoxyphenyl, 3-methoxyphenyl, and 4-propoxyphenyl and hydrogen. The term "$C_1$-$C_4$ lower alkyl," refers to methyl, ethyl, n-propyl, isopropyl, n-butyl, sec-butyl, isobutyl, and t-butyl; "$C_1$-$C_4$ lower alkoxy" means methoxy, ethoxy, n-propoxy, isopropoxy, n-butoxy, isobutoxy, sec-butoxy, and t-butoxy groups.

With reference to $R_1$ in the above formula, the term, "a carboxylic acid protecting group," refers to the commonly used carboxylic acid protecting ester groups such as t-butyl, benzyl, benzhydryl, p-nitrobenzyl, 3,5-dimethoxybenzyl, 2,2,2-trichloroethyl and like ester forming moieties. $R_1$ can also be the acyl radical of an acid affording protection of the carboxyl group by anhydride formation. Thus, $R_1$ can be the acyl radical

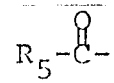

derived from an acid having the following formula

wherein $R_5$ is $C_1$-$C_8$ alkyl; halo $C_1$-$C_8$ alkyl; or

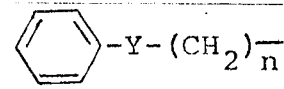

wherein Y is oxygen, sulfur, or a carbon to carbon bond; n is an integer of 0 to 3.

The resulting anhydride is a mixed anhydride comprising the carboxyl group of the cephalosporin and the acyl radical from the acid $R_5$ COOH. Examples of suitable mixed anhydrides include those derived from acetic acid, chloroacetic acid, propionic acid, valeric acid, phenylacetic acid, phenoxyacetic acid, and benzoic acid. The acetic and propionic mixed anhydrides are preferred because of their ease of preparation. Other mixed anhydrides not specifically named are equivalent and will perform the same blocking function as those named. When $R_1$ is an alkali or alkaline earth metal cation such cations as the lithium, sodium, potassium and calcium cations are representative.

With reference to the 3-substituent, —$CH_2R_2$, in the above formulae; when $R_2$ is hydrogen, —$CH_2R_2$ represents methyl. When $R_2$ is $C_2$-$C_5$ alkanoyloxy, $R_2$ represents acetoxy, propionoxy, butyroxy, pivaloyloxy and like radicals. When $R_2$ is $C_1$-$C_4$ alkyloxy, $R_2$ represents methoxy, ethoxy, propoxy, butoxy and like groups.

In the foregoing definitions, hydroxy, amino, and carboxy protecting groups are not exhaustively defined. The function of such groups is to protect the reactive functional groups during the preparation and then be easily removed without disrupting the remainder of the molecule. Mnay such protecting groups are well known in the art, and the use of other groups, not specifically listed, will be recognized as suitable in the present process.

The compounds of the present invention are prepared by reacting a 2-methylene-3-cephem sulfoxide represented by Formula II, wherein R, $R_1$, and $R_2$ are as defined above except that R and $R_1$ are other than hydrogen, with a carbanion in the form of an oxosulfonium methylide.

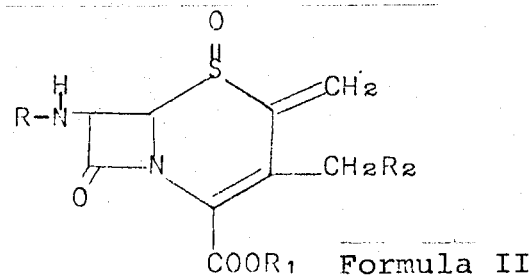

Formula II

The 2-methylene-3-cephem sulfoxides of the Formula II, the starting materials for the present invention, are prepared according to known reactions. The compounds of Formula II are prepared by treating a cephalosporin ester sulfoxide with aqueous formaldehyde and a variety of amine salts under Mannich conditions to form the expected Mannich product as an intermediate. The Mannich reaction product is unstable under the reaction conditions and loses the amine to give a methylene compound of the Formula II. The methods and procedures for the Mannich reaction are described by Wright, et al., *J. Med. Chem.* 14, 426 (1971) and U.S. copending application Ser. No. 16,573, filed March 4, 1970.

A compound represented by Formula I wherein q is 1 is prepared by reacting a 2-methylene-3-cephem sulfoxide represented by the Formula II with an oxosulfonium methylide in an anhydrous inert solvent via addition of the methylide across the methylene double bond. Sulfonium ylides are handled in the absence of moisture to avoid hydrolysis to the sulfonium hydroxide. Generally, the oxosulfonium methylide is generated in situ for convenience and is employed in excess. The reaction may be carried out conveniently at or about 0°C.; however, the addition occurs at a temperature of from about −40°C. to about 20°C.

Examples of oxosulfonium methylides are dimethyloxosulfonium methylide, prepared by Corey et al., *J. Am. Chem. Soc.* 87, 1353 (1965), and (dimethylamino) phenyloxosulfonium methylide prepared by Johnson et al., *J. Am. Chem. Soc.* 92, 6594 (1970). Preferably between 1.0 and 1.10 moles of methylide per mole of compound is generated in situ with the use of a base such as sodium hydride on a suitable oxosulfonium salt in dimethylformamide (DMF). DMF is employed as the solvent for the addition of starting materials and the amount thereof is not critical.

Solvents which may be employed in the present invention are any commonly used reaction solvents which are unreactive with the starting materials and products and are preferably those which do not undergo carbanionic reactions. In general, any solvent in which the starting material is at least partially soluble at the addition temperature and which is unreactive with the reaction mixture constituents can be employed. Exemplary of the solvents which are employed are dimethylacetamide (DMAC), dimethylformamide (DMF), dichloromethane, tetrahydrofuran, dioxane and other ethers, for example, the dimethylether of ethyleneglycol.

In a preferred embodiment of this invention, a solution of 2,2,2-trichloroethyl 2-methylene-3-methyl-7-phenoxyacetamido-3-cephem-4-carboxylate sulfoxide in DMF is added dropwise under nitrogen, to a DMF solution of (dimethylamino) phenyloxosulfonium methylide generated from (dimethylamino) methylphenyloxosulfonium fluoroborate and sodium hydride. The reaction is continued for about an hour at about 0°C. under nitrogen. The reaction mixture is diluted with ethyl acetate, washed, dried and evaporated to dryness. The residue is chromatographed to yield 2,2,2-trichloroethyl 3-methyl-7-(2-phenoxyacetamido)-2-spriocyclopropyl-3-cephem-4-carboxylate sulfoxide.

In a further embodiment of the present invention, the 7-methoxy-2-spirocyclopropyl cephalosporins, where, in Formula I, $R_3$ is methoxy, can be prepared according to the method described by copending U.S. application Ser. No. 222,293, filed Jan. 31, 1972.

Methyl lithium and dry methanol are added to dry tetrahydrofuran maintained at ice bath temperature. The solution is stirred under nitrogen and then cooled to a temperature of about −80°C. by means of a dry ice-acetone bath. To the cold solution is added a solution of 2,2,2-trichloroethyl 3-acetoxymethyl-2-spirocyclopropyl-7-[2-(2-thienyl)acetamido]-3-cephem-4-carboxylate in dry tetrahydrofuran, and the reaction mixture is stirred in the cold for 5 minutes. To the cold reaction mixture is added t-butyl hypochlorite, and the mixture is stirred for 10 minutes after addition of the chlorinating agent is complete. The reaction mixture is then quenched by adding glacial acetic acid. The mixture is evaporated and the residue dissolved in dichloromethane. The dichloromethane solution of the residue is washed, dried and evaporated to give pure product, 2,2,2-trichloroethyl 3-acetoxymethyl-7-methoxy-2-spirocyclopropyl-7-[2-(2-thienyl)acetamido]-3-cephem-4-carboxylate, after chromatography.

In a further embodiment of the present invention the 7-amino-2-spirocyclopropyl cephalosporins and the 7-amino-7-methoxy-2-spirocyclopropyl cephalosporins, where, in Formula I, R is hydrogen and $R_3$ is hydrogen or methoxy, are prepared with a compound represented by Formula I, where R is an acyl group, by cleavage of the 7-carboxamido group. The 7-carboxamido group is cleaved by blocking the carboxyl of the 2-spirocyclopropyl cephalosporin acid by conversion to a mixed anhydride as described in copending U.S. application Ser. No. 117,043, treating the blocked cephalosporin with a halogenating agent to convert the amido group to an imino halide, treating the imino halide with an alcohol to obtain an imino ether, and hydrolyzing the imino ether to give a free 7-amino group with concomitant removal of the blocking group.

The 2-spirocyclopropyl-3-cephem compounds provided by this invention are converted to 2-spirocyclopropyl cephalosporin acids according to methods well known to those skilled in the art. The 2-spirocyclopropyl-3-cephem sulfoxide esters represented by Formula I, wherein $q$ is 1, are reduced via a trivalent phosphorus compound as described in U.S. Pat. No. 3,641,014, for example. The reduction products, the 2-spirocyclopropyl-3-cephem acid esters, are converted to the 2-spirocyclopropyl cephalosporin acids by clearage of the ester groups, for example with zinc in acetic acid is described by Woodward et al., *J. Amer. Chem. Soc.* 88, 852 (1966) or with trifluoroacetic acid in anisole or by hydrogenolysis with palladium on carbon as described in British Patent 1,041,985.

The following reaction scheme illustrates the procedures employed in this invention and illustrates further the usefulness of the invention for converting 2-methylene cephalosporins into 2-spirocyclopropyl cephalosporins via the intermediates described.

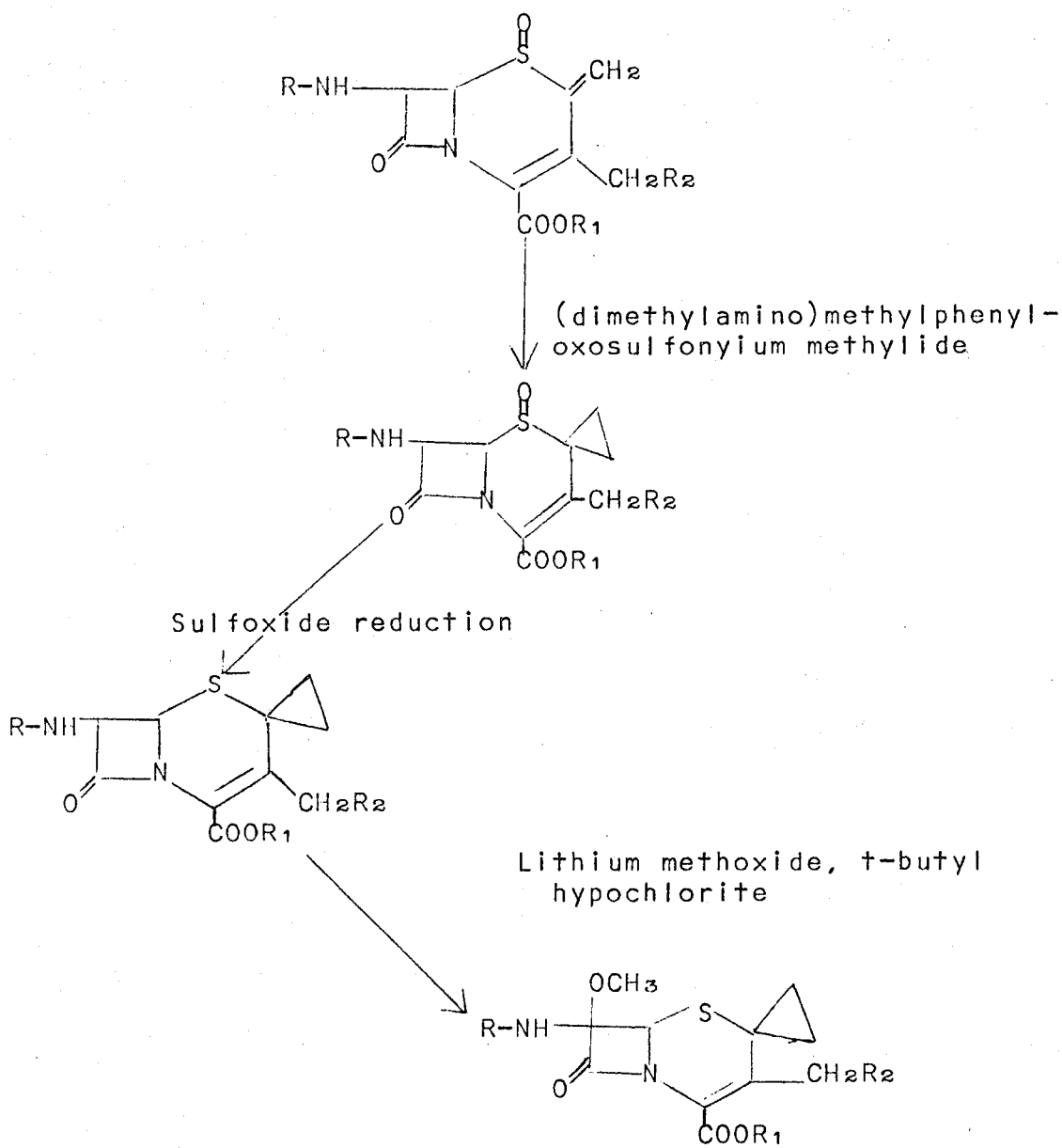

The novel 2-spirocyclopropyl cephalosporin acids of the present invention inhibit the growth of gram positive organisms at a concentration of 2 milligrams per milliliter in the standard agar dilution test as measured by zone inhibition. The compounds inhibit the growth of penicillin-resistant Staphlococcus aureus, clinical isolates V32, V41, at minimum inhibitory concentrations (MIC) from 100 micrograms per milliliter to 0.2 micrograms per milliliter by the gradient plate method described by Bryson and Szbalski in 1952 (Science 116:45–46). Typical of the activities of the instant 2-spirocyclopropyl cephalosporin acids expressed as organism/MIC are the following: 2-acetoxy-7-(2-phenoxyacetamido)-2-spirocyclopropyl-3-cephem-4-carboxylic acid, V32/0.5, V41/0.2 and V84/0.4; 3-acetoxy-7-[2-(2-thienyl)-acetamido]-2-spirocyclopropyl-3-cephem-4-carboxylic acid, V32/0.7, V41/0.5, and V84/0.7. The 2-spirocyclopropyl cephalosporin acids provided by the process of this invention are antibiotics useful for inhibiting the growth of micro-organisms pathogenic to both animal and plant life.

The 2-spirocyclopropyl cephalosporins are useful in combatting microbial infections in warm-blooded animals. When administered parenterally at a non-toxic dose between about 50 and 500 mg/kg. of body weight the compounds of the invention are effective in controlling bacterial infections in warm-blooded mammals. The compounds can be administered as a single dose or as multiple daily doses, dependent upon such conditions as the general health of the host and the type and severity of the infection. A compound of the invention can be administered as a single daily dose which regime may continue until the desired therapeutic result is achieved. Alternately, a treatment employing multiple doses, for example, three or four doses administered daily, may be used with a particular host.

Illustrative of the 2-spirocyclopropyl-3-cephem-4-carboxylic acids and esters which are provided by this invention are the following:

2,2,2-trichloroethyl 3-acetoxymethyl-7-[2-(2-thienyl)-acetamido]-2-spirocycloproyl-3-cephem-4-carboxylate sulfoxide 2,2,2-trichloroethyl 3-acetoxymethyl-7-(2-phenoxyacetamido)-2-spirocyclopropyl-3-cephem-4-carboxylate sulfoxide 2,2,2-trichloroethyl 3-methyl-7-(2-phenoxyacetamido-2-spirocyclopropyl-3-cephem-4-carboxylate sulfoxide 2,2,2-trichloroethyl 3-acetoxymethyl-7-[2-(2-thienyl-acetamido]-2-spirocylcopropyl-3-cephem-4-carboxylate 2,2,2-trichloroethyl 3-acetoxymethyl-7-(2-phenoxyacetamido)-2-spirocylcopropyl-3-cephem-4-carboxylate 2,2,2-trichloroethyl 3-acetoxymethyl-7-methoxy-7-(2-phenoxyacetamido)2-spirocyclopropyl-3-cephem-4-carboxylate 2,2,2-trichloroethyl 3-acetoxymethyl-7-methoxy-2-spirocyclopropyl-7-[2-(2-thienyl)acetamido]-3-cephem-4-carboxylate 2,2,2-trichloroethyl 3-methyl-7-(2-phenoxyacetamido)-2-spirocyclopropyl-3-cephem-4-carboxylate 3-acetoxymethyl-7-(2-phenoxyacetamido)-2-spirocyclopropyl-3-cephem-4-carboxylic acid 3-acetoxymethyl-7-[2-(2-thienyl)acetamido]-2-spirocyclopropyl-3-cephem-4-carboxylic acid 3-acetoxymethyl-7-methoxy-7-(2-phenoxyacetamido)-2-spirocycloproyl-3-cephem-4-carboxylic acid 3-acetoxymethyl-7-methoxy-2-spirocyclopropyl-7-[2-(2-thienyl)acetamido]-3-cephem-4-carboxylic acid 3-methyl-7-(2-phenoxyacetamido)-2-spirocyclopropyl-3-cephem-4-carboxylic acid benzhydryl 3-methoxymethyl-7-(4-trifluoromethylphenylacetamido)-2-spirocyclopropyl-3-cephem-4-carboxylate sulfoxide benzhydryl 3-methoxymethyl-7-(4-trifluoromethylphenylacetamido)-2-spirocyclopropyl-3-cephem-4-carboxylate 3-methoxymethyl-7-(4-trifluoromethylphenylacetamido)-2-spirocyclopropyl-3-cephem-4-carboxylic acid p-nitrobenzyl 3-isopropoxymethyl-7-[2-(2-thienyl)acetamido]-2-spirocyclopropyl-3-cephem-4-carboxylate sulfoxide p-nitrobenzyl 3-isopropoxymethyl-7-[2-(thienyl)acetamido]-2-spirocyclopropyl-3-cephem-4-carboxylate 3-isopropoxymethyl-7-[2-(2-thienyl)acetamido]-2-spirocyclopropyl-3-cephem-4-carboxylic acid 3,5-dimethoxybenzyl 7-(2-t-butoxycarbonylamino-2-phenylacetamido)-3-methyl-2-spirocyclopropyl-3-cephem-4-carboxylate sulfoxide 3,5-dimethoxybenzyl 7-(2-t-butyloxycarbonylamino-2-phenylacetamido)-3-methyl-2-spirocyclopropyl-3-cephem-4-carboxylate 7-(2-amino-2-phenylacetamido)-3-methyl-2-spirocyclopropyl-3-cephem-4-carboxylic acid 2,2,2-trichloroethyl 7-[2-t-butoxycarbonylamino-2-(2-thienyl)acetamido]-3-methyl-2-spirocyclopropyl-3-cephem-4-carboxylate sulfoxide 2,2,2-trichloroethyl 7-[2-t-butoxycarbonylamino-2-(2-thienyl)acetamido]-3-methyl-2-spirocyclopropyl-3-cephem-4-carboxylate 7-[2-amino-2-(2-thienyl)acetamido]-3-methyl-2-spirocyclopropyl-3-cephem-4-carboxylic acid t-butyl 7-(2-formyloxy-2-phenylacetamido)-3-methyl-2-spirocyclopropyl-3-cephem-4-carboxylate 7-(2-hydroxy-2-phenylacetamido)-3-methyl-2-spirocyclopropyl-4-carboxylic acid 3-acetoxymethyl-7-amino-2-spirocyclopropyl-3-cephem-4-carboxylic acid 3-acetoxymethyl-7-amino-7-methoxy-2-spirocycloproyl-3-cephem-4-carboxylic acid 7-amino-3-methyl-2-spirocyclopropyl-3-cephem-4-carboxylic acid 7-amino-7-methoxy-3-methyl-2-spirocyclopropyl-3-cephem-4-carboxylic acid p-nitrobenzyl 7-butyramido-3-methoxymethyl-2-spirocyclopropyl-3-cephem-4-carboxylate sulfoxide p-nitrobenzyl 7-butyramido-3-methoxymethyl-2-spirocyclopropyl-3-cephem-4-carboxylate 7-butyramido-3-methoxymethyl-2-spirocyclopropyl-3-cephem-4-carboxylic acid 2,2,2-trichloroethyl 7-acetamido-3-acetoxymethyl-7-methoxy-2-spirocyclopropyl-3-cephem-4-carboxylate 7-acetamido-3-acetoxymethyl-7-methoxy-2-spirocyclopropyl-3-cephem-4-carboxylic acid t-butyl 7-(2-phenylpropionamido)-3-methoxymethyl-2spirocyclopropyl-3-cephem-4-carboxylate sulfoxide t-butyl 7-(2-phenylpropionamido)-3-methoxymethyl-2-spirocyclopropyl-3-cephem-4-carboxylate 3-methoxymethyl-7-(2-phenylpropionamido)-2-spirocyclopropyl-3-cephem-4-carboxylic acid 3-acetoxymethyl-7-benzamido-2-spirocyclopropyl-3-cephem4-carboxylic acid 7-[2-(3-furyl)acetamido]-3-methoxymethyl-2-spirocyclopropyl-3-cephem-4-carboxylic acid 7-(2-amino-2-phenylpropionamido)-3-methyl-2-spirocyclopropyl-3-cephem-4-carboxylic acid 3-acetoxymethyl-7-methoxy-7-[2-(2-thienyl)acetamido]-2-spirocyclopropyl-3-cephem-4-carboxylic acid 7-methoxy-3-methyl-7-(2-phenoxyacetamido)-2-spirocyclopropyl-3-cephem-4-carboxylic acid 7-methoxy-3-methyl-2-spirocyclopropyl-7-[2-(2-thienyl)-acetamido]-3-cephem-4-carboxylic acid The cephalosporin acids of this invention readily form salts such as the lithium, sodium and potassium salts by the reaction of the free antibiotic acid in a suitable solvent with an alkali metal carbonate or bicarbonate.

The compounds of the invention, represented by the Formula I, which are esters or which contain a protected hydroxy or a protected amino function do not possess antibiotic activity to any appreciable degree. However, by removal of the hydroxy and amino function protecting groups, by employing well known methods and procedures, the antibiotic compounds of the invention are obtained where in the Formula I, $R_1$ is hydrogen and a free amino or free hydroxy group is present.

In the following illustrative example, infrared absorption spectrum and nuclear magnetic resonance spectrum are abrieviated IR and NMR respectively. Only the significant IR absorption attributable to the carbonyl function of the beta-lactam ring is given. Likewise, the pertinent peaks observed in the NMR spectra are listed. The nuclear magnetic resonance spectra were obtained on a Varian Associated T–60 Spectrometer with tetramethylsilane as the reference standard.

The chemical shifts are expressed in δ values and coupling constants (J) are expressed as Hz in parts per million (ppm).

The following standard abbreviations are employed for the observed peaks in the NMR spectra: $s$ equals singlet; $m$ equals multiplet; $q$ equals quartet; $d$ equals doublet.

EXAMPLE 1

Preparation of 2,2,2-Trichloroethyl 3-methyl-7-(2-phenoxyacetamido)-2-spirocyclopropyl-3-cephem-4-carboxylate sulfoxide Sodium hydride, 51 mg. (1.06 millimole) as a 50 percent mineral oil suspension, was added to (dimethylamino)methylphenyloxosulfonium fluoroborate, 288 mg. (1.06 millimole), in 100 ml. of dimethylformamide (DMF) cooled to about −5°C. under nitrogen. The mixture was stirred for 5 minutes at 0°C. to generate the (dimethylamino)phenyloxosulfonium methylide, resulting in a milky solution. To the cold milky solution thus obtained was added by dropwise addition a solution of 2,2,2-trichloroethyl 2-methylene-3-methyl-7-phenoxyacetamido-3-cephem-4-carboxylate sulfoxide, 508 mg. (1.0 millimole), in 6 ml. of DMF. The stirring was continued for 1 hour at 0°C. under nitrogen. The brown reaction mixture was diluted with 300 ml. of ethyl acetate and the solution was washed twice with a saturated sodium chloride solution. The ethyl acetate solution was dried over anhydrous sodium sulfate and evaporated to dryness, giving 908 mg. of residue. The residue was chromatographed on a silica gel column using benzene-ethyl acetate gradient to give 415 mg. of 2,2,2-trichloroethyl 3-methyl-7-(2-phenoxyacetamido)-2-spirocyclopropyl-3-cephem-4-carboxylate sulfoxide. Recrystallization from ethyl acetate gave colorless needles melting at about 222-223°C. with decomposition.

Analysis:
Calcd. for $C_{20}H_{19}Cl_3N_2O_6S$: C 46.04; H 3.67; N 5.37

Found: C 45.83; H 3.68; N 5.35
IR (CHCl$_3$): 1800(β-lactam) and 1060 cm.$^{-1}$ (sulfoxide). NMR in dimethylsulfoxide-d$_6$ showed bands at 1.00–1.80 (spirocyclopropyl,m); 1.88 (3-CH$_3$,s); 4.65 (OOCH$_2$,s); 4.90, 5.15 (CCl$_3$CH$_2$,m,J equals 12); 5.15 (H-6,d,J equals 4.0); 6.10 (H-7,q,J equals 4.0, 10); 8.20δ(7-NH,d,J equals 10).

EXAMPLE 2

Preparation of 2,2,2-Trichloroethyl 3-acetoxymethyl-7-[2-(2-thienyl)acetamido]-2-spirocyclopropyl-3-cephem-4-carboxylate sulfoxide Sodium hydride, 102 mg. (2.12 millimole), as a 50 percent mineral oil suspension, was added to (dimethylamino)methyl phenyloxosulfonium fluoroborate, 576 mg. (2.12 millimole), in 25 ml. of DMF cooled to about −5°C. under nitrogen. The mixture was stirred for 15 minutes at 0°C. to generate the (dimethylamino)phenyloxosulfonium methylide, resulting in a milky solution. 2,2,2-Trichloeoethyl 3-acetoxymethyl-2-methylene-7-(2-thienylacetamido)-3-cephem-4-carboxylate sulfoxide, 1112 mg. (2.0 millimole), was dissolved in 15 ml. of cold DMF and added dropwise to the stirred reaction mixture, cooled to about −8°C. The stirring was continued for 1 hour at about 0°C. under nitrogen. Several drops of saturated sodium chloride solution were added to destroy any excess sodium hydride and the brown reaction mixture was cooled to about −10°C. The reaction mixture was diluted with ethyl acetate and washed with water until the aqueous wash was clear. The ethyl acetate solution was washed successively, twice with one normal hydrochloric acid, once with saturated sodium bicarbonate solution and once with saturated sodium chloride solution, and was dried over anhydrous sodium sulfate. The ethyl acetate solution was evaporated to obtain 1,297 mg. of brown residue. The residue was chromatographed on a silica gel column using benzene-ethyl acetate gradient to give 1,000 mg. of 2,2,2-trichloroethyl 3-acetoxymethyl-7-[2-(2-thienyl)acetamido]-2-spirocyclopropyl-3-cephem-4-carboxylate sulfoxide. Recrystallization from acetone-hexane gave colorless needles melting at about 197°–198°C.

Analysis:
Calcd. for $C_{20}H_{19}Cl_3N_2O_7S_2$: C 42.15; H 3.36; N 4.92

Found: C 42.32; H 3.59; N 5.00
IR (CHCl$_3$): 1,804 (β-lactam) and 1,055 cm.$^{-1}$ (sulfoxide)

EXAMPLE 3

Preparation of 2,2,2-Trichloroethyl 3-acetoxymethyl-7-(2-phenoxyacetamido)-2-spirocyclopropyl-3-cephem-4-carboxylate sulfoxide.

Sodium hydride, 102 mg. (2.12 millimole) as a 50% mineral oil suspension, was added to (dimethylamino)methylphenyloxosulfonium fluoroborate, 576 mg. (2.12 millimole), in 25 ml. of DMF cooled to about −5°C. under nitrogen. The mixture was stirred for 10 minutes at 0°C. to generate the (dimethylamino)-phenyloxosulfonium methylide, resulting in a milky solution. 2,2,2-Trichloroethyl-3-acetoxymethyl-2-methylene-7-phenoxyacetamido-3-cephem-4-carboxylate sulfoxide, 1132 mg. (2.0 millimole), was dissolved in 15 ml. of DMF and added dropwise to the stirred reaction mixture, cooled to about −8°C. The stirring was continued for one hour at about 0°C. under nitrogen. The brown reaction mixture was cooled to about −10°C. and several drops of saturated sodium chloride solution were added to destroy any excess sodium hydride. The reaction mixture was diluted with ethyl acetate and washed with water until the aqueous wash was clear. The ethyl acetate solution was washed successively twice with one normal hydrochloric acid, once with saturated sodium bicarbonate solution and once with saturated sodium chloride solution, and was then dried over anhydrous sodium sulfate. The ethyl acetate solution was evaporated and the residue was chromatographed on a silica gel column using benzene-ethyl acetate gradient to give 950 mg. of 2,2,2-trichloro 3-acetoxymethyl-7(2-phenoxyacetamido)-2-spirocyclopropyl-3-cephem-4-carboxylate sulfoxide. Recrystallization from acetone-hexane gave colorless needles melting at about 187°–188°C.

Analysis:
Calcd. for $C_{22}H_{21}Cl_3N_2O_8S$: C 45.57; H 3.65; N 4.83
Found: C 45.62; H 3.52; N 5.05
IR (CHCl$_3$): 1,805 (β-lactam) and 1,060 cm.$^{-1}$ (sulfoxide)
NMR in deuterochloroform showed bands at 0.5–2.0 (spirocyclopropyl, m); 2.02 (3-CH$_3$CO$_2$,s); 4.5–5.7(OOCH$_2$, Cl$_3$CCH$_2$, CH$_3$CO$_2$CH$_2$, $_H$.6,m); 6.26 (H-7, q, J equals 5.0, 11.0); 7.94δ (NH,d, J equals 11.0).

EXAMPLE 4

Preparation of 2,2,2-Trichloroethyl 3-methyl-7-(2-phenoxyacetamido)-2-spirocyclopropyl-3-cephem-4-carboxylate Phosphorous trichloride, 0.566 ml (6.50 millimole), was added dropwise to 2,2,2-trichloro-3-methyl-7-phenoxyacetamido-2-spirocyclopropyl-3-cephem-4-carboxylate sulfoxide, 341 mg. (0.653 millimole), in 15 ml. of DMF cooled to about 5°C. The reaction mixture was stirred at room temperature for about 1 hour. The reaction mixture was diluted with ethyl acetate and washed successively thrice with water, once with saturated sodium bicarbonate solution and once with saturated sodium chloride solution, and was dried over anhydrous sodium sulfate. The ethyl acetate solution was evaporated and the brown residue chromatographed on a silica gel column using benzene-ethyl acetate gradient to give 272 mg. of 2,2,2-trichloro 3-methyl-7-phenoxyacetamido-2-spriocyclopropyl-3-cephem-4-carboxylate.

IR (CHCl$_3$): 1785 cm.$^{-1}$ ($\beta$-lactum)
NMR in deuterochloroform showed bands at 1.0-1.7 (spirocyclopropyl,m) 1.90 (s-CH$_3$s); 4.62 (OOCH$_2$,s); 4.86, 5.09 (CCl$_3$CH$_2$, m); 5.32 (H-6,d,J equals 4.5); 6.02$\delta$(H-7,q,J equals 4.5, 9.0).

EXAMPLE 5

Following the procedures described in example 4 the following compounds were prepared:

2,2,2-Trichloroethyl 3-acetoxymethyl-7-(2-phenoxyacetamido)-2-spirocyclopropyl-3-cephem-4-carboxylate
IR (CHCl$_3$): 1,786cm.$^{-1}$ ($\beta$-lactum)
The NMR in deuterochloroform showed bands at 0.7-1.60(spirocyclopropyl,m); 2.03 (CH$_3$CO$_2$, s); 4.55 (OOCH$_2$, s); 4.60 (CH$_3$CO$_2$CH$_2$,m); 4.79, 5.06 (CCl$_3$CH$_2$, m, J equals 12.0); 5.78 (H-6,d,J equals 4.5); 6.04$\delta$(H-7,q,J equals 4.5, 9.0).

2,2,2-Trichloroethyl 3-acetoxymethyl-2-spirocyclopropyl-7-[2(2-thienyl)acetamido]-3-cephem-4-carboxylate
IR (CHCl$_3$): 1,785 cm.$^{-1}$ ($\beta$-lactum)
The NMR in deuterochloroform showed bands at 0.7-1.8 (spirocyclopropyl,m); 2.02 (CH$_3$CO$_2$s); 3.84

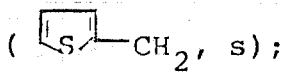

4.52, 4.65(CH$_3$CO$_2$CH$_2$,n, J equals 12.0); 4.76, 4.89 (CCl$_3$CH$_2$,m,J equals 12.0); 5.24 (H-6,d,J equals 5.0); 5.94 (H-7,q,J equals 5.0, 9.0); 6.40$\delta$(NH,d,J equals 9.0).

EXAMPLE 6

2,2,2-Trichloromethyl 3-acetoxy-7-methoxy-7-(2-phenoxyacetamido)-2-spirocyclopropyl-3-cephem-4-carboxylate To 25 ml. of dry tetrahydrofuran maintained at about 0°C. are added 3 ml. of 1.58 M methyl lithium and 6 ml. of dry methanol. The solution is stirred for about 5 minutes and is then cooled to approximately −80°C. by means of a dry ice-acetone bath. To the cold solution is added a solution of 562 mg. of 2,2,2-trichloroethyl 3-acetoxy-7-(2-phenoxyacetamido-2-spirocyclopropyl-3-cephem-4-carboxylate in 8 ml. of dry tetrahydrofuran, and the reaction mixture is stirred for 2 minutes following the addition. To the reaction mixture is then added 0.143 ml. of t-butyl hypochlorite and the reaction mixture is stirred for 10 minutes following the addition of the hypochlorite. The reaction is then quenched by the addition of 6 ml. of 98 percent formic acid. The quenched reaction mixture is evaporated in vacuo and the residue dissolved in dichloromethane. The solution is washed consecutively with a saturated solution of sodium chloride, dilute aqueous sodium chloride, dilute aqueous sodium thiosulfate, a saturated solution of sodium bicarbonate and finally with a saturated sodium chloride solution. The washed solution is then evaporated in vacuo to dryness to provide 2,2,2-trichloroethyl 3-acetoxy-7-methoxy-7-(2-phenoxyacetamido)-2-spirocyclopropyl-3-cephem-4-carboxylate.

IR (CHCl$_3$): 1783 ($\beta$-lactam) and 1086 cm.$^{-1}$ (CH$_3$O)

The NMR in deuterochloroform showed bands at 0.9-1.6 (spirocyclopropyl,m); 2.02 (CH$_3$CO$_2$,s); 3.54 (CH$_3$O,s); 4.51, 4.66 (CH$_3$CO$_2$CH$_2$,m,J equals 13.0); 4.57 (OOCH$_2$,s); 4.80, 5.04 (CCl$_3$CH$_2$,m, J equals 12.0); 5.41 (H-6,S); 7.54$\delta$(NH,s).

EXAMPLE 7

Following the methods and procedures of Example 6 is prepared 2,2,2-trichloroethyl 3-acetoxymethyl-7-methoxy-2-spirocyclopropyl-7-[2-(2-thienyl)acetamido]-3-cephem-4-carboxylate IR (CHCl$_3$): 1780 ($\beta$-lactam) and 1090 cm.$^{-1}$ (CH$_3$O). The NMR in deuterochlorform showed bands at 0.9-1.6 (spirocyclopropyl, m); 2.03 (CH$_3$CO$_3$,s); 3.48(CH$_3$O,s); 3.88

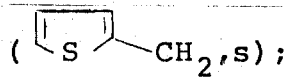

4.50, 4.65 (CH$_3$CO$_2$CH$_2$, m); 4.78, 5.02 (CCl$_3$CH$_2$,m); 5.36 (H-6,s); 6.78 (NH,s); 7.0$\delta$

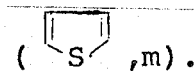

EXAMPLE 8

Preparation of 3-Acetoxymethyl-7-methoxy-7-(2-phenoxyacetamido)-2-spirocyclopropyl-3-cephem-4-carboxylic acid 2,2,2-Trichloroethyl 3-acetoxymethyl-7-methoxy-7-(2-phenoxyacetamido)-2-spirocyclopropyl-3-cephem-4-carboxylate, 343 mg. (0.57 millimole), was dissolved in a mixture of 30 ml. of DMF amd 5 ml. of glacial acetic acid cooled to about 0°C. Zinc dust, 343 mg., was added in one lot to the stirred reaction mixture. The mixture was stirred for one hour at 0°C. and then filtered to remove the zinc dust using ethyl acetate as a wash. The ethyl acetate mixture was extracted with three portions of saturated sodium bicarbonate solution. The ethyl acetate solution containing neutral material was washed once with saturated sodium chloride and then dried over anhydrous sodium sulfate. The ethyl acetate was evaporated to give 32 mg. starting material. The sodium bicarbonate extract was layered with ethyl acetate and then acidified with one normal hydrochloric acid. Acid material was extracted into ethyl acetate and the ethyl acetate solution was washed with saturated sodium chloride solution. The ethyl acetate solution was dried over anhydrous sodium sulfate and evaporated to give 131 mg. of 3-acetoxymethyl-7-methoxy-7-(2-phenoxyacetamido)-2-spirocyclopropyl-3-cephem-4-carboxylic acid characterized by physical data.
IR (CHCl$_3$): 1780 cm.$^{-1}$ ($\beta$-lactum)
The NMR in deuterochloroform showed bands at 0.8–1.6 (spirocyclopropyl,m); 2.06 (CH$_3$CO$_2$,s); 3.57 (CH$_3$O,s); 4.63 (OOCH$_2$,CH$_3$CO$_2$CH$_2$,s); 5.35 (H-6,s); 7.79$\delta$(NH,s).

EXAMPLE 9

Following the procedures described in Example 8 3-acetoxymethyl-7-methoxy-2-spirocyclopropyl-7-[2-(2-thienyl)-acetamido]-3-cephem-4-carboxylic acid was prepared.
IR (CHCl$_3$): 1,780 ($\beta$-lactum) and 1,090 cm.$^{-1}$ (CH$_3$O)

The NMR in deuterochloroform showed bands at 0.7–1.6 (spirocyclopropyl,m); 2.07 (CH$_3$CO$_2$,s); 3.45 (CH$_3$O,s); 3.90

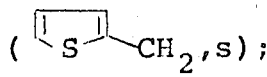

4.60 (CH$_3$CO$_2$CH$_2$s); 5.30 (H-6,s); 7.0

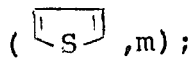

7.70$\delta$(NH,s).

EXAMPLE 10

Preparation of 3-Methyl-7-(2-phenoxyacetamido)-2-spirocyclopropyl-3-cephem-4-carboxylic acid
2,2,2-Trichloroethyl-3-methyl-7-(2-phenoxyacetamido)-2-spirocyclopropyl-3-cephem-4-carboxylate, 236 mg. (0.468 millimole), was dissolved in a mixture of 30 ml. of DMF and 5 ml. of glacial acetic acid cooled to about 0°C. Zinc dust, 236 mg., was added in one lot to the stirred reaction mixture. The mixture was stirred for 1 hour at 0°C. and then filtered to remove the zinc dust, using ethyl acetate as a wash. The ethyl acetate mixture was extracted with three portions of saturated sodium bicarbonate solution. The ethyl acetate solution containing neutral material was washed once with saturated sodium chloride solution and then dried over anhydrous sodium sulfate. The ethyl acetate was evaporated to give 60 mg. starting material. The sodium bicarbonate extract was layered with ethyl acetate and then acidified with one normal hydrochloric acid. Acid material was extracted into ethyl acetate and the ethyl acetate solution was washed with saturated sodium chloride solution. The ethyl acetate solution was dried over anhydrous sodium sulfate and evaporated to give 68 mg. of 3-methyl-7-(2-phenoxyacetamido-2-spirocyclopropyl-3-cephem-4-carboxylic acid which was characterized by physical data.
IR (CHCl$_3$): 1,780 cm.$^{-1}$ ($\beta$-lactum)
The NMR in deuterochloroform showed bands at 0.7–1.6 (spirocyclopropyl, m); 1.80 (3-CH$_3$,S); 4.50 (OOCH$_2$,S); 5.12 (H-6,c,J equals 4.0); 5.80$\delta$(H-7,q,J equals 4.0, 8.0).

EXAMPLES 11 AND 12

Following the procedures described in example 10 the following compounds were prepared.

3-Acetoxymethyl-7-(2-phenoxyacetamido-2-spirocyclopropyl-3-cephem-4-carboxylic acid
IR (CHCl$_3$): 1785 cm.$^{-1}$ ($\beta$-lactum)
The NMR in deuterochloroform showed bands at 0.6–1.6 (spirocyclopropyl, m); 2.00 (CH$_3$CO$_2$, s); 4.50 (OOCH$_2$, CH$_3$CO$_2$CH$_2$, s); 5.16 (H-6,d,J equals 4.0); 5.82$\delta$(H-7,m).
3-Acetoxymethyl-2-spirocyclopropyl-7-[2-(2-thienyl)-acetamido]-3-cephem-4-carboxylic acid
The NMR in deuterochloroform showed bands at 0.6–1.6 (spirocyclopropyl, m); 2.00(CH$_3$CO$_2$,s); 3.80

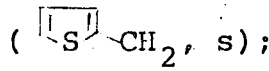

4.60 (CH$_3$CO$_2$CH$_2$,s); 5.19(H-6,d); 5.82$\delta$(H-7,q).
I claim:
1. A compound of the formula

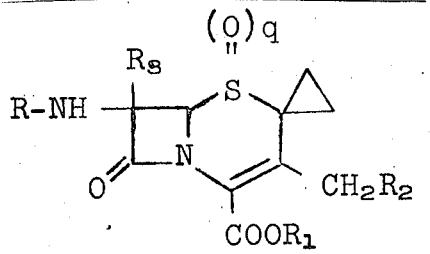

wherein R is hydrogen, C$_1$-C$_8$ alkanoyl, benzoyl, or a group represented by the formula

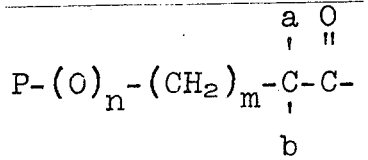

wherein P is 2-thienyl, 3-thienyl, 2-furyl, 3-furyl, phenyl or phenyl substituted by bromo, chloro, fluoro, C$_1$-C$_4$ lower alkyl, C$_1$-C$_4$ lower alkoxy, hydroxy or trifluoromethyl,
n is 0 or 1,
m is 0 or an integer of from 1 to 3,
a is hydrogen or C$_1$-C$_3$ alkyl,
b is hydrogen, C$_1$-C$_3$ alkyl, hydroxy, protected hydroxy, amino or protected amino;
with the limitation that when n is 1, P is phenyl or phenyl substituted by bromo, chloro, C$_1$-C$_4$ lower alkyl, C$_1$-C$_4$ lower alkoxy, hydroxy or trifluoromethyl, and b is hydrogen or C$_1$-C$_3$ alkyl;

R$_1$ is hydrogen, a carboxylic acid protecting group or an alkali metal or alkaline earth metal cation;
R$_2$ is hydrogen, C$_2$-C$_5$ alkanoyloxy or C$_1$-C$_4$ alkyloxy;

R$_3$ is hydrogen or methoxy;
q is 0 or 1; and when q is 1, R$_3$ is hydrogen.
2. A compound as defined in claim 1 wherein q is 1.
3. A compound as defined in claim 2 wherein the compound is 2,2,2-trichloroethyl 3-acetoxymethyl-7-(2-phenoxyacetamido)-2-spirocyclopropyl-3-cephem-4-carboxylate sulfoxide.
4. A compound as defined in claim 2 wherein the compound is 2,2,2-trichloroethyl 3-acetoxymethyl-7-

[2(2-thienyl)acetamido]-2 spirocyclopropyl-3-cephem-4-carboxylate sulfoxide.

5. A compound as defined in claim 2 wherein the compound is 2,2,2-trichloroethyl 3-methyl-7-(2-phenoxyacetamido)-2-spirocyclopropyl-3-cephem-4-carboxylate sulfoxide.

6. A compound as defined in claim 2 wherein the compound is 2,2,2-trichloroethyl 7-acetamido-3-methyl-2-spirocyclopropyl-3-cephem-4-carboxylate sulfoxide.

7. A compound as defined in claim 2 wherein the compound is 2,2,2-trichloroethyl 3-acetoxymethyl-7-(2-t-butoxycarbonylamino-2-phenylacetamido)-3-cephem-4-carboxylate sulfoxide.

8. A compound as defined in claim 1 wherein $q$ is 0.

9. A compound as defined in claim 8 wherein the compound is 3-acetoxymethyl-7-(2-phenoxyacetamido)-2-spirocyclopropyl-3-cephem-4-carboxylic acid.

10. A compound as defined in claim 8 wherein the compound is 3-acetoxymethyl-7-[2-(2-thienyl)acetamido]-2-spirocyclopropyl-3-cephem-4-carboxylic acid.

11. A compound as defined in claim 8 wherein the compound is 3-acetoxymethyl-7-methoxy-7-(2-phenoxyacetamido)-2-spirocyclopropyl-3-cephem-4-carboxylic acid.

12. A compound as defined in claim 8 wherein the compound is 3-acetoxymethyl-7-methoxy-2-spirocyclopropyl-7-[2-(2-thienyl)acetamido]-3-cephem-4-carboxylic acid.

13. A compound as defined in claim 8 wherein the compound is 3-methyl-7-(2-phenoxyacetamido)-2-spirocyclopropyl-3-cephem-4-carboxylic acid.

14. The process for preparing the compound of claim 1, wherein $q$ is 1, R is a group other than hydrogen and $R_3$ is hydrogen which comprises reacting in a substantially anhydrous inert solvent at a temperature between $-40°C.$ to $20°C.$, a compound of the formula

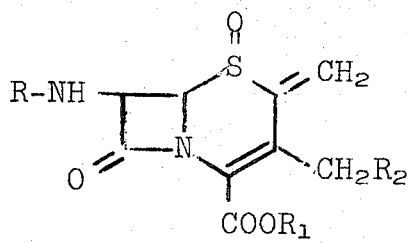

with an oxosulfonium methylide selected from the group consisting of dimethyloxosulfonium methylide and (dimethylamino) phenyloxosulfonium methylide wherein R is $C_1-C_8$ alkanoyl, benzoyl or a group represented by the formula

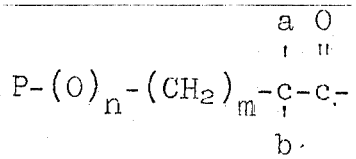

wherein P is 2-thienyl, 3-thienyl, 2-furyl, 3-furyl, phenyl or substituted phenyl wherein the substituent is bromo, chloro, fluoro, $C_1-C_4$ lower alkyl, $C_1-C_4$ lower alkoxy, hydroxy or trifluoromethyl, $n$ is 0 or 1, $m$ is 0 or an integer from 1 to 3, $a$ is hydrogen or $C_1-C_3$ alkyl, $b$ is hydrogen, $C_1-C_3$ alkyl, hydroxy, protected hydroxy, amino or protected amino; with the limitation that when $n$ is 1, P is phenyl or substituted phenyl and $b$ is $C_1-C_3$ alkyl;

$R_1$ is a carboxylic acid protecting group, or an alkali metal or alkaline earth metal cation; and $R_2$ is hydrogen, $C_2-C_5$ alkanoyloxy, or $C_1-C_4$ alkyloxy.

15. The process of claim 14 wherein the oxosulfonium methylide is (dimethylamino)phenyloxosulfonium methylide.

* * * * *